United States Patent
Spears et al.

[11] Patent Number: 6,131,883
[45] Date of Patent: Oct. 17, 2000

[54] STRUT REMOVAL TOOL

[75] Inventors: Thomas G. Spears, Burr Ridge, Ill.; James R. Ryshavy, Cologne, Minn.

[73] Assignee: Northstar Manufacturing Co., Inc., Minnetonka, Minn.

[21] Appl. No.: 09/376,208

[22] Filed: Aug. 18, 1999

[51] Int. Cl.[7] .................................................. B60P 1/48
[52] U.S. Cl. .......................................... 254/10.5; 254/130
[58] Field of Search ........................ 29/227, 267, DIG. 5; 254/130, 10.5

[56] References Cited

U.S. PATENT DOCUMENTS

| | | | |
|---|---|---|---|
| 1,342,057 | 6/1920 | Miller | 254/130 |
| 3,912,224 | 10/1975 | Castoe | 254/10.5 |
| 5,172,889 | 12/1992 | Post et al. | 254/10.5 |

FOREIGN PATENT DOCUMENTS

| | | | |
|---|---|---|---|
| 108456 | 1/1925 | Switzerland | 254/130 |

*Primary Examiner*—David A. Scherbel
*Assistant Examiner*—Daniel G. Shanley
*Attorney, Agent, or Firm*—Haugen Law Firm PLLP

[57] ABSTRACT

A pry tool for facilitating disassembly of suspension components in a vehicle wheel suspension assembly which includes a vehicular telescopic strut member secured to a steering knuckle. The tool comprises a handle member along with a fulcrum tower, with the combination being arranged to substantially enclose the strut, and through forces created by the pry tool, and against the coil spring, the tool enables and facilitates removal of the steering knuckle from the body of the strut. The pry tool includes an elongated handle with a handle yoke at one end for enclosing or enveloping the strut, and with a fulcrum yoke at the opposed end for contacting the upper end of the steering knuckle. Axial removal forces are applied between the coil spring and the steering knuckle, thereby freeing the strut component from the assembly.

4 Claims, 3 Drawing Sheets

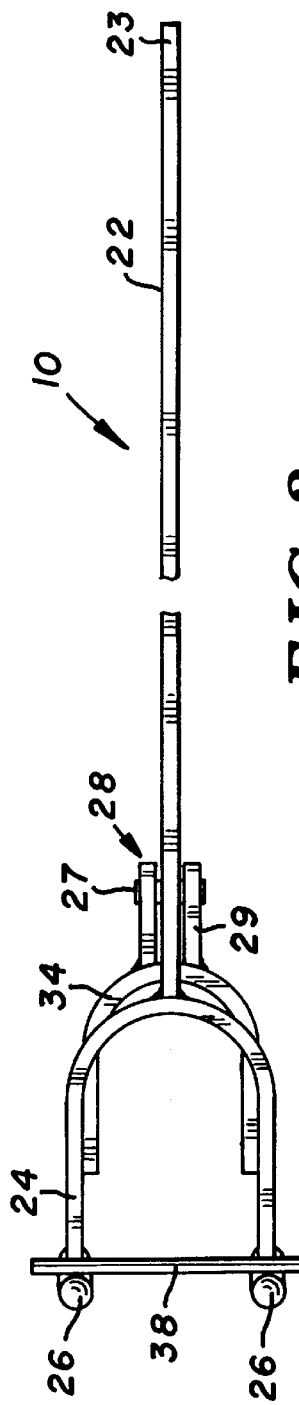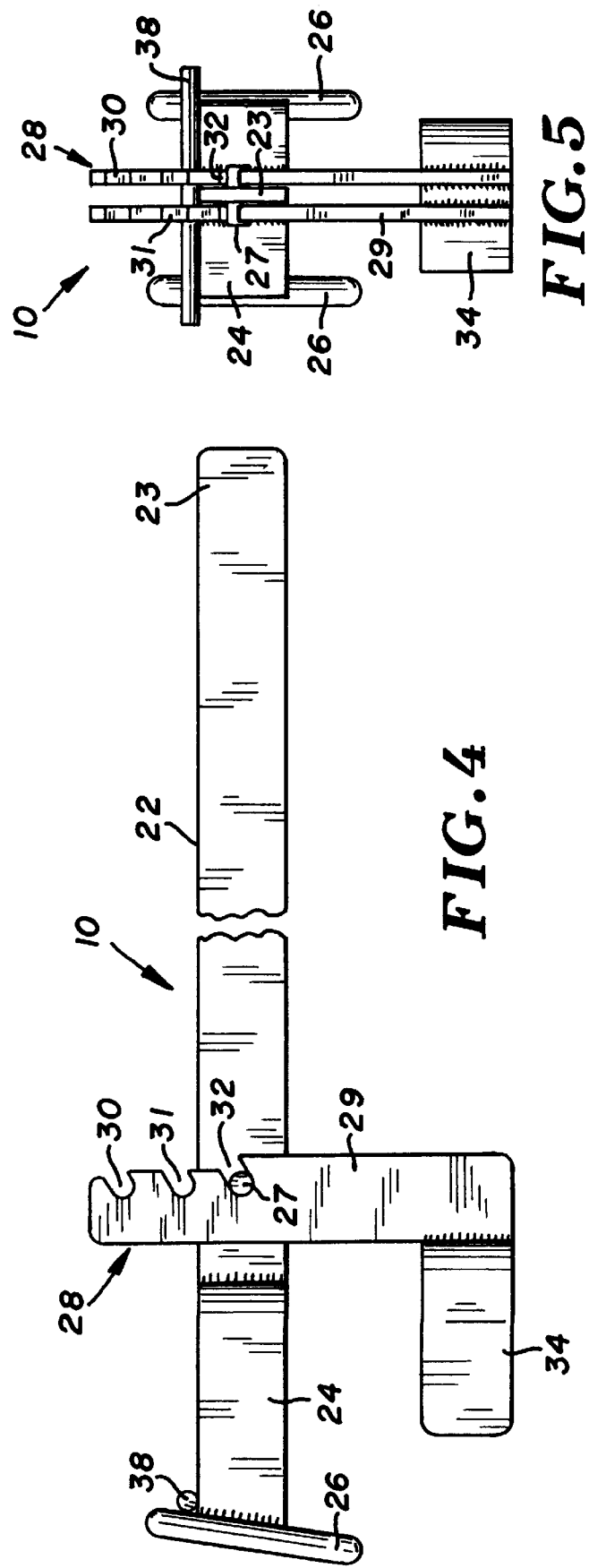

STRUT REMOVAL TOOL

BACKGROUND OF THE INVENTION

The present invention relates generally to a tool for facilitating disassembly of suspension components in a vehicle wheel suspension assembly, and more particularly to a tool for facilitating the removal of a vehicular telescopic strut member from a wheel assembly, wherein the strut member, as a component in the wheel suspension assembly, must be separated from the steering knuckle prior to removal. Strut-type suspension systems are well known and commonly used in motor vehicles, with the strut assembly being a perishable component requiring replacement after some reasonably extensive periods of service or resulting from collision damage.

At the present time, strut-type suspensions are preferred for use in automobiles, particularly those designed for conventional on-road service and purposes. Suspensions for these vehicles employ a telescopic strut member which may, in certain instances, function as a shock absorber or dampener as well as a device for properly orienting and positioning the wheel assembly. McPherson struts are perhaps the most commonly employed struts used for this type of assembly, and are particularly useful in independent front and rear suspension systems. For example, the top end of the front wheel strut is securely positioned at a predetermined point in the vehicle chassis, particularly in a tower zone or area immediately above the front wheel assembly. This point may also extend or project modestly into the engine compartment. The bottom end of the strut is typically secured to the steering knuckle by means of a pair of inwardly extending ears which form a portion of the knuckle clamping bracket. Proper positioning of the bottom of the strut is further controlled by conventional linkage, including the fore-and-aft or drag link. The strut member is positioned generally concentrically within a coil spring component in the assembly, with the front struts normally being provided with two side ears which extend radially outwardly from the strut in contact with the base of the coil spring.

Since these strut assemblies frequently have a lifetime which is less than the anticipated lifetime of the vehicle, it becomes necessary to replace these struts from time to time either due to either extensive wear or collision damage. These struts are frequently difficult to remove from the assembly, with the bottom end of the strut ordinarily becoming corroded, and thereby frozen to the inwardly extending ears and surfaces of other portions of the knuckle including the clamping bracket. For example, corrosion initiated primarily by electrolytic action of two dissimilar metals is responsible for the difficulty experienced in removal, with electrolytic corrosion occurring due to the frequent presence of electrolytes such as sodium chloride, calcium chloride, and other ionic materials used in combating ice formation on highway surfaces. Thus, the strut is almost constantly exposed to extremely hostile environments during use, and as such, is subject to this type of corrosion in the process.

SUMMARY OF THE INVENTION

In accordance with the present invention, a pry tool or means is provided for facilitating the removal of the strut member from a vehicle wheel suspension assembly. The pry means comprises the combination of an elongated pry handle member and a fulcrum tower. The handle member comprises a body having a gripping handle or portion at one end, and a strut enclosing coil spring contacting handle yoke at the opposite end thereof. A transversely extending pivot pin is rigidly secured to the handle adjacent the distal or yoke end, and projects laterally outwardly from both sides of the elongated body. The fulcrum tower comprises a tower member having upper and lower ends and with a plurality of generally inwardly extending notches adjacent the top for receiving the outwardly projecting lateral extensions of the pivot pin. A strut enclosing adaptor collar is secured to the tower at its lower end, with the adaptor collar being configured to mate with or otherwise engage the upper end of the steering knuckle. Additionally, the pry yoke has a pair of generally upwardly extending canted contact pins, with one pin being secured to each free end of the handle yoke.

With this combination of features, the present arrangement is designed to be placed in operative relationship with the wheel suspension assembly so that the handle yoke rests against or otherwise contacts the lower end of the coil spring, and the bottom end of the tower yoke rests against the end of knuckle adjacent the clamping bracket. Downward motion of the gripping portion of the handle creates a pivotal motion of the handle around the pivot pin so as to apply a substantial force against the steering knuckle in a direction to move the steering knuckle away from the coil spring. The applied force is virtually entirely axial, and hence the effectiveness in removal is significantly enhanced over other devices and/or techniques which may apply either torque and/or forces with radial components to break the components away from one another. The utilization of adaptor collars which function to extend the stroke length of the tool may also be employed. In this fashion, therefore, the pry tool or means of the present invention facilitates removal of a vehicular telescopic strut member from a vehicle wheel suspension assembly with this operation being significantly and substantially simplified and expedited by utilization of this invention.

Therefore, it is a primary object of the present invention to provide an improved pry means for facilitating removal of vehicular telescopic strut members from a vehicle wheel assembly with the invention expediting such removal and breaking any surface fusion or "freezing" which may have occurred over time from surface-to-surface contact of dissimilar metals.

It is yet a further object of the present invention to provide an improved pry tool for expediting removal of vehicular telescopic strut members from vehicle wheel assemblies, with the device including an elongated pry handle member through which a force is created between the coil spring and the steering knuckle, thereby forcing the steering knuckle assembly away from the strut.

Other and further objects of the present invention will become apparent to those skilled in the art upon a study of the following specification, appended claims, and accompanying drawings.

IN THE DRAWINGS

FIG. 3 is a top plan view of the pry means of the present invention, and illustrating the handle positioned within the notches formed in the fulcrum tower;

FIGS. 4 and 5 are side views and end views respectively of the pry tool illustrated in FIGS. 1–3, with FIGS. 3 and 4 illustrating an optional cross contact pin being shown in place;

DESCRIPTION OF THE PREFERRED EMBODIMENT

Figure 1:
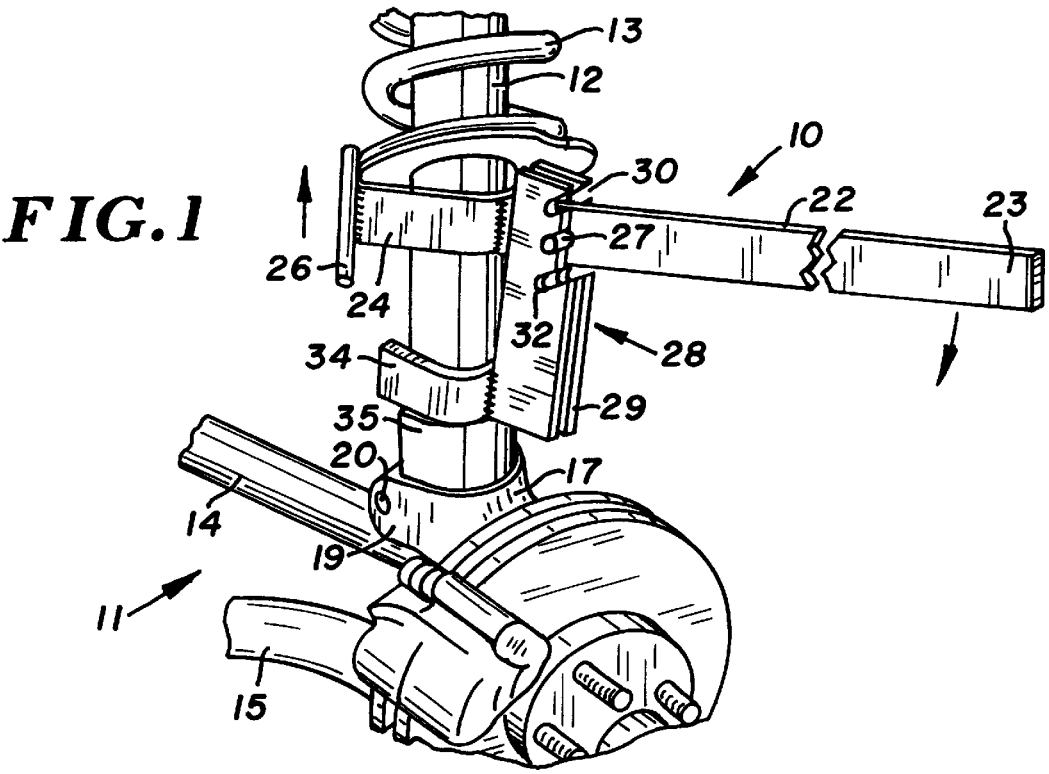
FIG. 1 is a perspective view of a typical vehicle wheel suspension assembly including a telescopic strut member, and wherein the pry tool of the present invention is positioned for the application of a removal force between the coil spring and the attachment ears of the steering knuckle.
Figure 2:
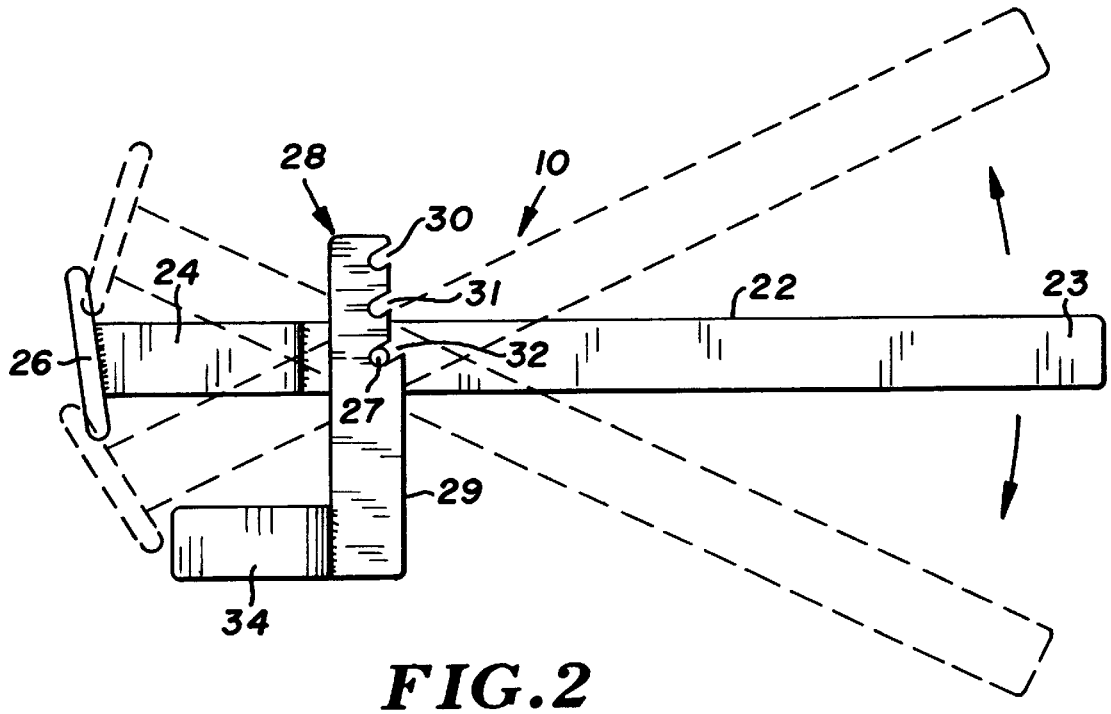
FIG. 2 is a side elevational view illustrating the actuation motion contemplated in connection with the pry means of the present invention, and showing, in phantom, various stages of motion in a typical operation.

In accordance with the preferred embodiment of the present invention, and with particular attention being directed to FIG. 1 of the drawings, the pry tool generally designated 10 is shown in combination with a typical vehicle wheel suspension assembly generally designated 11, and wherein the telescopic strut member 12 is arranged generally concentrically within coil spring 13. Additionally, typical vehicle drive and suspension components utilized in a typical wheel assembly are shown at 14 and 15, with these components being shown to disclose the environment in which the pry means is being utilized. As indicated, strut 12 is coupled to steering knuckle 17 by means of a pair of clamping ears 19 which extend inwardly of the knuckle, and with clamping bolt 20 being employed to apply the appropriate force needed to couple and/or retain the knuckle 17 in place on strut 12 during normal operation of the vehicle. This steering knuckle as shown, along with the suspension and drive components are typical for use in vehicles of present-day manufacture. The force applied is virtually entirely axial, and hence the effectiveness in removal is significantly enhanced over other devices and/or techniques which may apply either torque and/or other forces with radial components.

Pry tool or means 10 comprises an elongated pry handle member 22 with a body having a gripping portion 23 at the proximal end, and with a strut enclosing handle yoke 24 at the opposed or distal end. Yoke 24 includes a pair of generally canted contact pins 26–26, with each of the contact pins 26–26 being mounted in spaced apart relationship and somewhat oblique to the axis of the handle. Contact pins 26–26 are secured to either free end of handle yoke 24. Pivot pin 27 is provided which extends transversely through handle 22 and is positioned generally adjacent handle yoke 24, to enhance the mechanical advantage or leverage available in the mechanism.

A fulcrum tower generally designated 28 is provided with tower 28 including a body 29 having a plurality of inwardly extending notches 30, 31, 32 formed therewithin. Notches 30–32 inclusive are angularly positioned, and extend downwardly and inwardly in order to assist and aid in capturing and retaining pin 27 therewithin during actual operation. Fulcrum tower 28 further includes a strut enclosing adaptor collar 34 at its lower end, with the base of yoke or collar 34 being adapted to contact the top surface of steering knuckle adjacent ears 19 of knuckle clamp 17.

Figure 6:
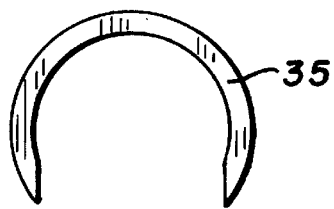
FIGS. 6 and 7 are end views and side views respectively of an adaptor collar utilized in connection with the present invention.
Figure 7:
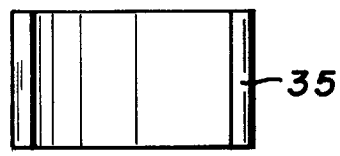

For those installations wherein the fulcrum tower 28 does not have sufficient length to accomplish complete steering knuckle removal, adaptor collar 35, as shown in FIGS. 6 and 7, is placed between fulcrum tower 28 and steering knuckle 17. The addition of an adaptor collar increases the effective length of stroke of pry tool 10.

Figure 8:
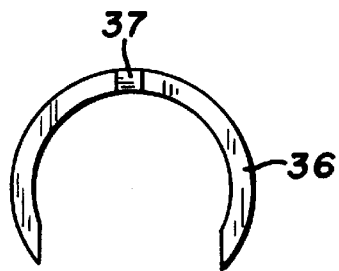
FIGS. 8 and 9 are end views and side views respectively of a slotted adaptor collar.
Figure 9:
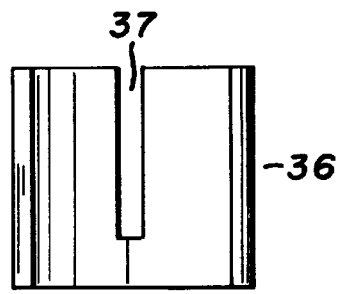

In those installations where a transversely extending projection may be present on the steering knuckle or strut tube, slotted adaptor collar 36 as shown in FIGS. 8 and 9 may be employed. This slotted adaptor is also designed to accommodate radial projections that may extend from portions of attachment including the steering knuckle mechanism.

In certain applications and installations, it is helpful to have a cross contact pin present on handle yoke 24. For such applications, cross contact pin 38 may be utilized, with pin 38 being secured across and between contact pins 26, 27 for gaining leverage against other components in certain suspension designs.

OPERATION FOR FRONT WHEEL STRUT REMOVAL

In actual operation, the removal procedure for one typical vehicle proceeds in accordance with the following recommended steps:

1. Raise vehicle so relevant suspension hangs freely. Support safely.

2. Remove tire, ABS wire bracket, brake hose bracket at both strut and frame, tie rod end and sway bar bracket at strut, using 8 mm socket and 18 mm box wrench to keep sway bar stud from spinning.

3. Where present, remove the pinch bolt 20 from knuckle 17.

4. Place the base of the fulcrum tower 28 around the strut body 12 and against knuckle 17.

5. Install the handle member 22 with pin 27 in the lowest notch of notches 30–32 inclusive with the contact pins 26–27 being positioned under coil spring 13, or alternatively, under two side ears located adjacent the spring on strut attachment.

Figure 10:
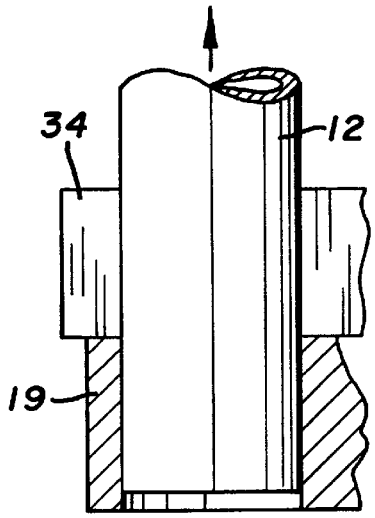
FIGS. 10, 11 and 12 are detailed fragmentary side views, on a slightly enlarged scale, of the pry means of the present invention showing the strut removal operation in first, second and third stages respectively.

6. Press downwardly on handle 23 to urge knuckle assembly 17 downwardly (see first stage of removal, FIG. 10).

7. Continue moving lever handle downwardly, and if desired, rotate handle rearwardly to assist and/or urge knuckle to roll off the bottom of the strut.

8. Move the lever up one or two notches in fulcrum tower 28, if required.

Figure 11:
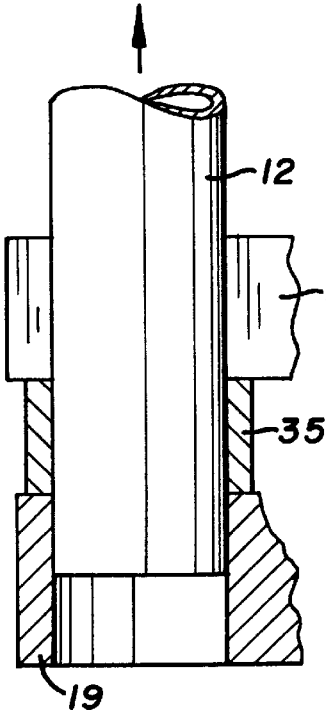

9. So long as steering knuckle 17 remains attached, add adaptor collar 35 to tool assembly, specifically at base of fulcrum tower 28 (second stage of removal, FIG. 11).

Figure 12:
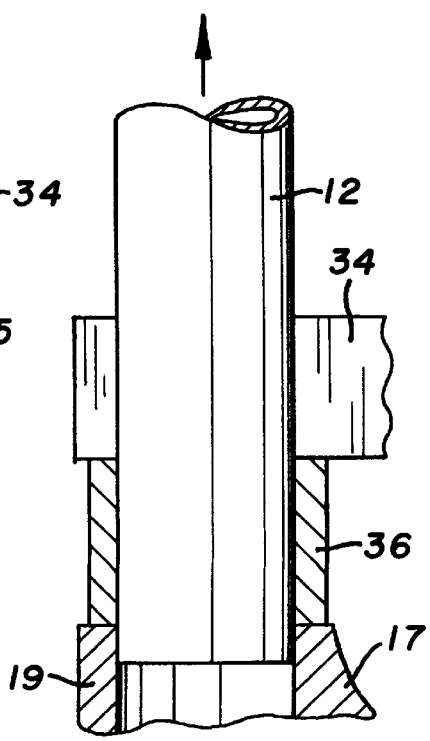

10. If appropriate, slotted adaptor collar 36 may be employed in order to accommodate the presence of laterally or transversely extending projections from knuckle or strut tube (third stage of removal, FIG. 12).

OPERATION FOR REAR WHEEL STRUT REMOVAL

1. Raise vehicle so relevant suspension hangs freely. Support safely.

2. Remove tire, lower hardware from both sway bar links, brake hose bolts at strut and frame, and strut pinch bolt. Carefully bend the brake line away from the strut to gain clearance for the tool if required.

3. Install a relatively long split collar around the attachment tab at the base of strut, with the slot 37 facing upwardly. The base of fulcrum tower 28 is placed on top of collar 36 and lever pivot pin is inserted in the middle notch 31 of fulcrum tower 28, with the outwardly contact pins 26, 27 facing upwardly. Contact pins 26, 27 are hooked behind the lower spring plate on coil spring 13.

4. Handle 23 is pressed downwardly until knuckle 17 is moved axially about one inch.

5. Remove tool and collar.

6. Place fulcrum tower 28 directly on knuckle 17 and install pivot pin into the middle notch 31 with the inwardly canted contact pins 26, 27 facing upwardly.

7. Place crossbar pin 38 across the top of yoke under the sway bar bracket member (not shown) normally secured or attached to strut 12.

8. Push downwardly on handle 23 until knuckle 17 is removed from strut 12.

As previously indicated, the removal process is facilitated by virtue of the direct application of axial forces to the steering knuckle 17. Utilization of the pry tool of the present invention has been found to significantly expedite and facilitate removal of struts from wheel suspension assemblies, and particularly those struts which have become frozen or otherwise corroded into a substantially locked disposition with attachment components of the steering knuckle. The forces created by the pry tool forming the present invention are utilized to free the steering knuckle from the strut so as to permit its subsequent removal and replacement.

Of course, it will be appreciated that the examples given herein are for purposes of illustration only, and are not to be construed as a limitation upon the scope of the present invention.

What is claimed is:

1. Pry means for facilitating the removal of a vehicular telescopic strut member from a vehicle wheel suspension assembly comprising a telescopic strut member and a steering knuckle assembly, and wherein the telescopic strut member being removed is a component in the assembly and positioned generally concentrically within a coil suspension spring component in said assembly and wherein the telescopic strut member is attached at its upper end to the vehicle chassis and at its lower end to said steering knuckle assembly through a pair of inwardly extending ears of the knuckle clamping bracket; said pry means comprising, in combination;

(a) an elongated pry handle member with an elongated body having a gripping portion at the proximal end and with a strut enclosing coil spring contacting handle yoke at the distal end;

(b) a transversely extending pivot pin rigidly secured to said elongated pry handle member at a point generally adjacent said distal end and extending laterally outwardly of said elongated body;

(c) a fulcrum tower member with upper and lower ends and having a plurality of generally inwardly extending notch means adjacent the top end thereof for receiving the lateral extension portions of said pivot pin and having a strut enclosing adapter collar coupled to the lower end thereof;

(d) said handle yoke having a pair of generally upwardly extending angularly canted contact pins with one of each of said contact pins being secured to either of the free ends of said handle yoke;

(e) the arrangement being such that when said handle yoke rests against the lower end of said coil spring and said tower yoke rests against the clamping bracket of said steering knuckle assembly, downward motion of the gripping portion of said handle member creates a pivoting lever action of said handle around the said transversely extending pivot pin of said handle and applies substantial force against said steering knuckle in a direction to move said steering knuckle assembly away from said coil spring.

2. The pry means of claim 1 being particularly characterized in that at least one adaptor collar extension component is provided for releasable positioning between the base of said tower yoke and the top of said steering knuckle clamp for extending the effective length of said fulcrum tower.

3. The pry means of claim 1 wherein at least one adaptor collar is provided, with one of said adaptor collars being slotted axially to accommodate radially extending components extending transversely of said telescopic strut.

4. The pry means of claim 1 wherein a cross contact pin is provided for positioning across said yoke proximally of said contact pins.

* * * * *